F. J. VLCHEK.
SCRAPER.
APPLICATION FILED JUNE 26, 1911.
1,015,461.
Patented Jan. 23, 1912.
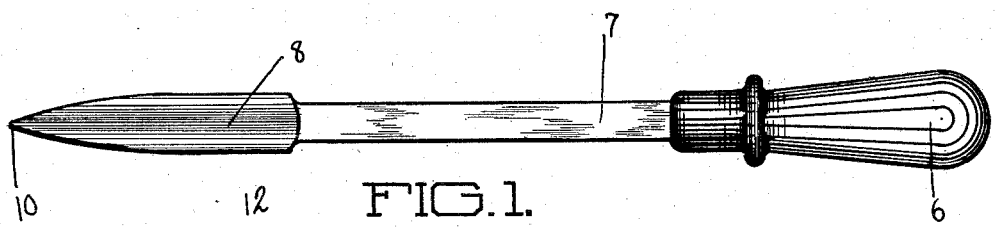
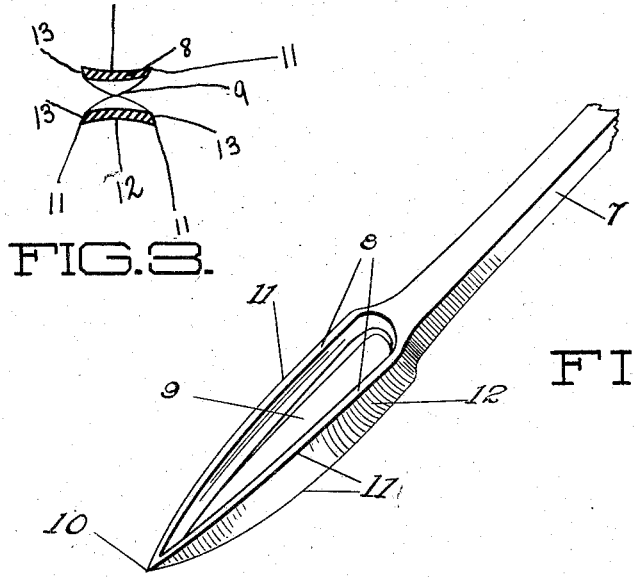
Witnesses
William Schribel
C. N. Whitfield.
Inventor
Frank J. Vlchek
by Bommhardt & Co.
Attorneys

UNITED STATES PATENT OFFICE.

FRANK J. VLCHEK, OF CLEVELAND, OHIO.

SCRAPER.

1,015,461.  Specification of Letters Patent.  Patented Jan. 23, 1912.

Application filed June 26, 1911. Serial No. 635,496.

*To all whom it may concern:*

Be it known that I, FRANK J. VLCHEK, citizen of the United States, residing at Cleveland, in the county of Cuyahoga and State of Ohio, have invented certain new and useful Improvements in Scrapers, of which the following is a specification.

This invention relates to scrapers, and particularly to scrapers for operating on metal, said scrapers being used by machinists for the purpose of dressing plane or curved surfaces.

The object of the invention is to provide a scraper in which chattering is reduced to a minimum, and which can be readily sharpened and which will have a plurality of cutting edges capable of being sharpened repeatedly so that the tool will have long life.

The invention is illustrated in the accompanying drawings in which—

Figures 1 and 2 are side views of the scraper at right angles to each other. Fig. 3 is a section on the line 3—3 of Fig. 2. Fig. 4 is a perspective view of the head of the scraper.

Referring specifically to the drawings, 6 indicates the handle of the tool and 7 its shank.

The head of the tool is, preferably, integral with the shank, and has two opposite blades or parts 8 with an elongated recess or hollow 9 therebetween. The blades project from the end of the shank, and at their front ends are united, and taper to a point 10. Each blade has two cutting edges 11, and between the cutting edges the blade is slightly concave, as shown at 12. Each blade is of substantially the same thickness in cross section, as shown in Fig. 3, and from the cutting edges of the blades they are backed off slightly as indicated at 13, thus providing an edge which is somewhat less than a right angle and which can be readily sharpened.

It will be seen that there are four cutting edges, which are slightly curved in outline, as shown in Fig. 1, and which taper to a fine point which can be inserted in small bushings or cavities for the purpose of scraping the same. The shape is quite convenient to enable the tool to be used on either plane or curved work. By making the head hollow or with a recess therein it is light, so that it can be used quite delicately, and I believe that this hollow construction gives a certain springiness to the tool, which prevents chattering. In any event I have found that it chatters much less than a solid tool. The blades are of substantially uniform thickness and can be rubbed down indefinitely, at the edges thereof, to sharpen the same, which gives long life to the tool.

Having thus described my invention, what I claim as new and desire to secure by Letters Patent is:—

1. A scraping tool having an elongated head with an elongated transverse recess therein, forming two opposite blades which are inclined toward each other and joined at the front end, each blade having opposite cutting edges, all of said cutting edges ending in a point at the front end of the head.

2. A scraping tool having a head with similar opposite blades curved toward each other and united at the front end, each blade having opposite longitudinal cutting edges, said blades being concaved between said edges, and the head being hollow between the blades.

In testimony whereof, I do affix my signature in presence of two witnesses.

FRANK J. VLCHEK.

Witnesses:
 JOHN A. BOMMHARDT,
 STEDMAN J. ROCKWELL.

Copies of this patent may be obtained for five cents each, by addressing the "Commissioner of Patents, Washington, D. C."